United States Patent [19]

Loggers

[11] Patent Number: 4,770,709

[45] Date of Patent: Sep. 13, 1988

[54] PROCESS OF PRETREATING A POZZOLANIC MATERIAL FOR INCREASING THE POZZOLANIC PROPERTIES OF SAID MATERIAL

[75] Inventor: Hendrik Loggers, Amerongen, Netherlands

[73] Assignee: Aardelite Holding B.V., Nunspeet, Netherlands

[21] Appl. No.: 83,978

[22] Filed: Aug. 11, 1987

Related U.S. Application Data

[63] Continuation of Ser. No. 853,458, Apr. 18, 1986, abandoned.

[30] Foreign Application Priority Data

Apr. 18, 1985 [NL] Netherlands ......................... 8501137

[51] Int. Cl.$^4$ ................................................. C04B 7/34
[52] U.S. Cl. ..................................... 106/118; 106/120; 106/DIG. 1
[58] Field of Search .............................. 106/117–120, 106/DIG. 1

[56] References Cited

U.S. PATENT DOCUMENTS 4,018,619 4/1977 Webster et al. ..................... 106/118
4,490,178 12/1984 Loggers et al. ..................... 106/118

FOREIGN PATENT DOCUMENTS 2384729 11/1978 France ................................ 106/118
2501669 9/1982 France ........................ 106/DIG. 1

Primary Examiner—Steven Capella
Attorney, Agent, or Firm—Edmund M. Jaskiewicz

[57] ABSTRACT

The pozzolanic properties of a pozzolanic material, more particularly a fly ash, are improved by mixing the pozzolanic material with a calciumoxyde or calciumhydroxide containing material and water in such a way that at the time of associating or bringing together the abovementioned components the mixture has or immediately attains a temperature of more than 50° C., preferably at least 80° C., most preferably 85° to 100° C.

A mixture of pozzolanic material and calciumoxyde and/or calciumhydroxide may be preheated, subsequently, water being added to said mixture.

Water as used may be hot water and said water is preferably added as one mass at one moment.

The pozzolanic material obtained from the process of the invention is suitable as cement substitute, as material for manufacturing building articles and a binder for occluding one or more fillers to be introduced into a chemical process or one or more fillers presenting noxious properties.

7 Claims, No Drawings

PROCESS OF PRETREATING A POZZOLANIC MATERIAL FOR INCREASING THE POZZOLANIC PROPERTIES OF SAID MATERIAL

This is a continuation of application Ser. No. 853,458 filed Apr. 18, 1986, now abandoned.

BACKGROUND OF THE INVENTION

The invention relates to a process of increasing the pozzolanic properties of a pozzolanic material, particularly fly ash from coal-fired units such as vessels of coal-fired power stations and whirling bed vessels and similar types of fly ash in order to increase the reactivity in relation to binding agents. By way of distinction binding agents can be divided into those reacting directly with fly ash such as calcium hydroxide containing substances and those reacting indirectly such as cements and unslaked limes.

Fly ashes are generally held to be pozzolanic i.e. in water they react with calcium hydroxide and subsequently harden.

Practice shows that such hardening proceeds very slowly and that there exist quite a few fly ashes that do not or hardly harden at all although such fly ashes do absorb a large quantity of calcium hydroxide.

SUMMARY OF INVENTION

It is an object of the invention to provide a process of pretreating a pozzolanic material, particularly fly ashes in such a way that in conjunction with calcium hydroxide containing substances and water, conceivably in the presence of other substances, this leads to hardenable mixtures attaining very high degrees of strength after hardening.

According to the invention this aim is attained in that a process of increasing the pozzolanic properties of a pozzolanic material particularly a fly ash is characterized in that during the action of water upon a mixture of pozzolanic material and calcium hydroxide and/or calciumhydroxide said mixture has or attains immediately a temperature of more than 50° C.

Preferably the mixture has or immediately attains a temperature comprised between 80° and 100° C. more particularly a temperature comprised between 90° and 95° C.

It appears that by using a high temperature at the time of associating or bringing together the three components of the process viz. a pozzolanic material, calcium oxide and/or calcium hydroxide and water pozzolanic materials, more particularly fly ashes which do not react or only react very slowly are activated so that the affinity of the pozzolanic material, particularly fly ash, in relation to calcium hydroxide is effected in a very favourable manner.

The pretreated product as obtained according to the invention can be used for manufacturing building materials, making a binding agent for absorbing and occluding noxious substances or for absorbing chemical compounds to be introduced into a process. The strengths of the hardened binder, the combination of pretreated pozzolanic material more particularly fly ash, calcium hydroxide containing substance, water and conceivably other substances can be brought to a very high value by proper composition.

Use of the pretreated pozzolanic material, more particularly fly ash, in cement also provides better results as with non-pretreated fly ash. For the use in cement such fly ash has only to be subjected to a pretreatment, and subsequently a proper drying so that the fly ash is obtained in powder form suitably for mixing with cement. The strengths of hardened mixtures of pretreated fly ash, calcium hydroxide containing substance and water is of the same level as obtained by hardening mixtures of grinded granulated blast furnace slag material and calcium hydroxide containing substance and water.

Applying the process according to the invention for manufacturing building material wherein fly ash in bound directly boils down to the fly ash being pretreated during the mixing of ash, lime and water which is preferably added in the form of hot water and possibly another substance or other substances whereupon the mass is made into a granular material or into the shape of the building material desired in order to be subsequently hardened.

Moreover the pretreatment method according to the invention offers the possibility of being able to combine fly ash better with cement and affords an extended range of the applicability of fly ashes.

The binding agent, the mixture of pretreated fly ash, water and lime can also be used for agglomerating a waste product of blast furnace operations such a oxysludge and for pelletizing or briquetting phosphate ore or bauxite-containing substances, to which fly ash may be considered to belong as well. Furthermore the binding agent is also quite suitable for the treatment of other substances.

Variation in the amount of calcium hydroxide to be incorporated in the mixture of pretreated fly ash, calcium hydroxide and water does not change the strengths of the hardened binder. Generally speaking depending upon the hardening conditions, the amount of calcium hydroxide in the binder may vary from some % by weight to about 20% by weight. Many compounds may be incorporated in the binder. Some of these substances are gypsum of the phosphoric acid preparation or from the flue gas desulfuration, harbour sludge etc.

Soil containing impurities, waste from sewage purification, phosphate ore, iron ore, finally divided metal and metal compounds, carbon black, cokes or combinations of some of these substances, oxycalcium hydroxide sludge or oxysludge.

DESCRIPTION OF THE PREFERRED EMBODIMENTS

Example I

A mixture of 93 kg cold fly ash from a coal-fired power plant, 7 kg slaked calcium hydroxide mainly consistly of calcuim hydroxide is mixed with 20 kg of water at a temperature of 20° C. After mixing the mixture is granulated by adding some additional water.

The granules as obtained are cured in a steam atmosphere of 95° C. for 8 hours.

The same mixture as mentioned hereinbefore is prepared but the way of mixing is different.

First of all the fly ash is mixed dry with the slaked lime and the whole is brought to a temperature of about 92° C. in a double-walled mixer. The water as used has a temperature of 95° C. The hot water and the heated mixture are then associated and mixed. Hardening is executed in the same way as hereinbefore in a steam atmosphere of 95° C. for 8 hours.

After hardening the grain strengths of the grains from the sieve fraction 10-13 mm is in the first case 25 kg while by applying a heated mixture and heated water the grainstrength amounts to 70 kg.

The grain strength is determined by placing a grain between two plates and subsequently exerting a pressure upon one of the plates. The point load pressure causing break of the grain is determined.

Example II

Two mixtures are prepared but instead of 7 kg slaked lime, 5.4 kg of unslaked lime consisting for 92% of calcium hydroxide is used. The temperature of the mixture does not rise above 65° C.

In a comparative experiment the components are heated as described in example I so that during mixing from the first contact of the fly ash with the water the temperature raised above 80° C. Due to the reaction heat emitted by the reaction of unslaked lime and water the temperature rises very rapidly and calcium hydroxide dissolves so that the reactions forming the basis for the later strength in the product are able to proceed above 90° C. The grains obtained from the non preheated mixture present a grain strength of 18 kg while the grains obtained from the preheated mixture present a strength of 88 kg.

Example III

Instead of 7 kg slaked lime as in example 1, 10 kg of Portland cement is used. The effect of the pretreatment occurs but is relatively smaller.

Cold mixing provides grains with a grain strength of 16 kg and hot mixing provides a grainstrength of 22 kg.

The amount of cement in the mixture was 9%.

As cement after contact with water only provides some calcium hydroxide after some hours this experiment was repeated in combination with slaked lime.

For comparative purposes two mixtures are prepared consisting of:

Fly ash—42.5% by weight.
Coal-ash—28.3% by weight.
Slaked lime—3.0% by weight.
Cement p.c.a.—3.4% by weight.
Water—22.8% by weight.

The grainstrength of the grains of the sieve fraction 10-13 mm has a value of 18 kg when cold mixing is used, and a mixture obtained by hot mixing provides a grain strength of 40 kg.

Example IV

Example III is repeated but 1% by weight of a mixture of gypsum and calciumsulfite is added to the mixture.

The grainstrenght is 22 kg when cold mixing is used and in the case of hot mixing (a temperature of the mixture comprised between 90° C. and 100° C. immediately as water contacts the mixture) 58 kg.

Example V

In a mixer the temperature of the fly ash is increased by introducing steam. After having reached a sufficiently high temperature hot water of 98° C. is added to the mixture of ash and condensed water (4%). The amount of unslaked lime amounted to 5.5% by weight based on the weight of the dry ash. The temperature during the contact of the water with the different components was 91° C. as some steam escaped from the mixer. After mixing the mixture is stored for some time in a container and subsequently granulated. A part of the granules is stored in the air and another part is hardened by means of a heat treatment by steam as described in example I.

The granules obtained from a mixture prepared by mixing at increased temperature have a grain strength (sieve-fraction from 10-13 mm) of 79 kg.

The granules hardened under air present a strength of 54 kg after two weeks storage under air which is already sufficient for many applications in concrete.

Here the increase of strength depends on the time.

Already after one week a grain strength of 36 kg is obtained.

Example VI

The temperature of the mixture in the mixer is not brought in the right range so that the temperature is below 50° C. Hardened granules only provide a grain strength of 30 kg whilst the granules stored in the air present a grain strength of 14 kg after one year.

Example VII

A mixture obtained by hot mixing of 9,5 kg fly ash and 5 kg slaked lime is dried and stored for some time. After grinding the material is mixed with Portland cement in a ratio of 1:1. A part of this mixture is subsequently mixed with sand in the ratio 30% mixture and 70% sand. From the mixture a cube of 7×7×7 cm is pressed. This cube is hardened.

A second cube is manufactured from a mixture of 70% sand and 30% last furnace cement which cube is hardened in the same way as the first cube.

The strength of the cube obtained from fly ash amounts to 380 kg/cm² whilst the cube obtained from blast furnace cement has a strength of 360 kg/cm².

This result is very remarkable as literature describes many experiments with fly ashes which only show a very small increase of strength by replacing small amounts of cement by this mixture or even descreases of strength.

Example VIII

Phosphoric acid waste gypsum is mixed with fly ash in the ratio of e.g. 1:1. By blowing steam through this mixture in a mixer the temperature is increased to about 94° C. Subsequently calcium hydroxide is added and the whole amount of hot water is rapidly introduced into the mixer by instantaneously opening the valve of a container containing said water. Subsequently the material is granulated, the grain strength of the granules of the sieve fraction 10-13 mm is 80 kg.

Cold mixing of such a mixture provides granules having a strength of only 40 kg.

What is claimed is:

1. In a process of increasing the pozzolanic properties of a pozzolanic material, including fly ash, the steps of mixing pozzolanic material, calcium oxide and/or calcium hydroxide and water, at least one of said pozzolanic material, calcium oxide and/or calcium hydroxide and water being pretreated in such a manner that at the time of adding the water to a mixture of pozzolanic material and calcium oxide and/or calcium hydroxide the resulting mixture immediately attains a temperature of 80-100 deg. C.

2. In a process according to claim 1, wherein the total amount of water is added to a mixture of fly ash and calcium oxide and/or calcium hydroxide as one mass at one time.

3. In a process according to claim 1, wherein a mixture of heated fly ash and calcium oxide and/or calcium hydroxide is mixed with water.

4. In a process according to claim 1, wherein pozzolanic material, calcium oxide and/or calcium hydroxide and preheated water are mixed.

5. In a process according to claim 1, wherein the resulting mixture is used as a substitute for cement, such that the resulting mixture has or immediately thereafter attains a temperature of 80°–100° C.

6. In a process according to claim 1, wherein the resulting mixture of pozzolanic material, water and calcium hydroxide after having attained a temperature of 80°–100° C. is molded into an article being cured.

7. In a process according to claim 1, wherein the resulting mixture is mixed as binding agent with a filler, consisting of phosphoric acid waste gypsum and the mixture with said filler is molded into articles which are cured.

* * * * *